United States Patent [19]

Gittelbauer

[11] 4,414,825

[45] Nov. 15, 1983

[54] COOLING DEVICE FOR CARBON ANODES

[75] Inventor: Joachim Gittelbauer, Cologne, Fed. Rep. of Germany

[73] Assignee: Klöckner-Humboldt-Deutz AG, Fed. Rep. of Germany

[21] Appl. No.: 396,400

[22] Filed: Jul. 8, 1982

[30] Foreign Application Priority Data

Jul. 15, 1981 [DE] Fed. Rep. of Germany ....... 3127909

[51] Int. Cl.³ .............................................. F25D 17/02
[52] U.S. Cl. ........................................ 62/374; 62/380; 198/489; 198/655; 198/796
[58] Field of Search ................... 62/63, 374, 375, 380; 198/489, 655, 796

[56] References Cited

U.S. PATENT DOCUMENTS

| 2,153,742 | 4/1939 | Conn | 62/63 |
| 2,619,000 | 11/1952 | Churchill | 198/655 |
| 2,772,005 | 11/1956 | Dubin et al. | 198/655 |
| 2,779,490 | 1/1957 | Clarke et al. | 198/489 |
| 3,199,652 | 8/1965 | Kilner et al. | 198/489 |
| 3,389,568 | 6/1968 | Miller et al. | 62/63 |
| 3,557,940 | 1/1971 | Rogers et al. | 198/796 |

Primary Examiner—Ronald C. Capossela
Attorney, Agent, or Firm—Hill, Van Santen, Steadman & Simpson

[57] ABSTRACT

A mechanism for cooling molded bodies such as green carbon anodes including a disk shaped concave receiving transfer means which receives the bodies and either rejects them or transfers them to individual support stations on a cooling conveyor which carries them through a cooling zone, and delivers them to a discharge transfer means which either accepts or rejects the anodes, and the transfer means is selectively pivotal about either lateral edge to accept or reject the anodes.

15 Claims, 3 Drawing Figures

# 4,414,825

COOLING DEVICE FOR CARBON ANODES

BACKGROUND OF THE INVENTION

The invention relates to devices for cooling molded bodies consisting of shapable or moldable masses, particularly carbon anodes, wherein the device includes a receiving transfer means, a conveyor for carrying the bodies through a cooling zone and a discharge transfer means.

The beginning raw material for the production of carbon anodes in, for example, the aluminum electrolysis process, is a mixture of petroleum coke and pitch which is mixed at temperatures between 130° C. and 170° C. and is subsequently compressed in a stamping or forming system and shaped into a green anode. A calcining process follows whereby an electrically conductive carbon body is formed upon coking or carbonization of the pitch in a reducing atmosphere.

The green anodes leaving the forming process are subsequently supplied to a calcining station, but have little shape stability so that for transfer, cooling of the anodes is indispensable after the shaping. In providing a cooling device for the anodes not only the thermal effect of the cooling must to taken into consideration, but the handling or transfer of the green anode must be given thorough consideration because this green anode exhibits low stability and shape retention and presents particular problems. The conveying and transfer of the anodes into the cooling device must be carried out with a minimum of mechanical stress on the moldable bodies.

An object of the present invention is to provide a device for cooling molded bodies which are comprised of shapable masses, and in particular for cooling the green anodes which in addition to providing an effective cooling, also guarantees as gentle a manipulation as possible of the anodes in a simple manner.

In accordance with the principles of the present invention, the foregoing object is achieved by the conveying means being provided with grate-like support elements and the mechanism is provided with receiving and discharge transfer means which have a disk shaped element shaped to match the shape of the surface of the molded green anodes. The green relatively soft carbon anodes proceed through the cooling means in an expediently designed shape and are supported throughout the travel through the cooling zone so that mechanical stress during this period of processing is maintained as low as possible on the anode. The particular grate-like support elements also guarantee an optimum cooling effect inasmuch as the major portion of the surface of the anodes can be exposed to effect of the cooling agent. The transfer elements at the receiving end, during transfer through the cooling zone, and at the delivery end are matched as to surface shape to the molded bodies thus resulting in a particularly gentle handling.

It is a further object of the invention to provide an improved device for handling green carbon anodes wherein the anodes are gently received, transferred to a cooling conveyor, and are removed from the conveyor at the cooling end, with the option of discharging rejected anodes either at the receiving end or at the discharge end.

In accordance with the invention, this selective receiving or rejecting of the anodes is accomplished by a unique construction and pivotal support arrangement for the receiving and for the delivery transfer means wherein the transfer means can be pivoted about a first axis to reject the anodes or about a second axis to accept the anodes.

Further advantages, features and particulars of the invention will be appreciated with the teaching of the principles thereof in connection with the disclosure of the preferred embodiment in the specification, claims and drawings, in which:

DESCRIPTION

Figure 1:
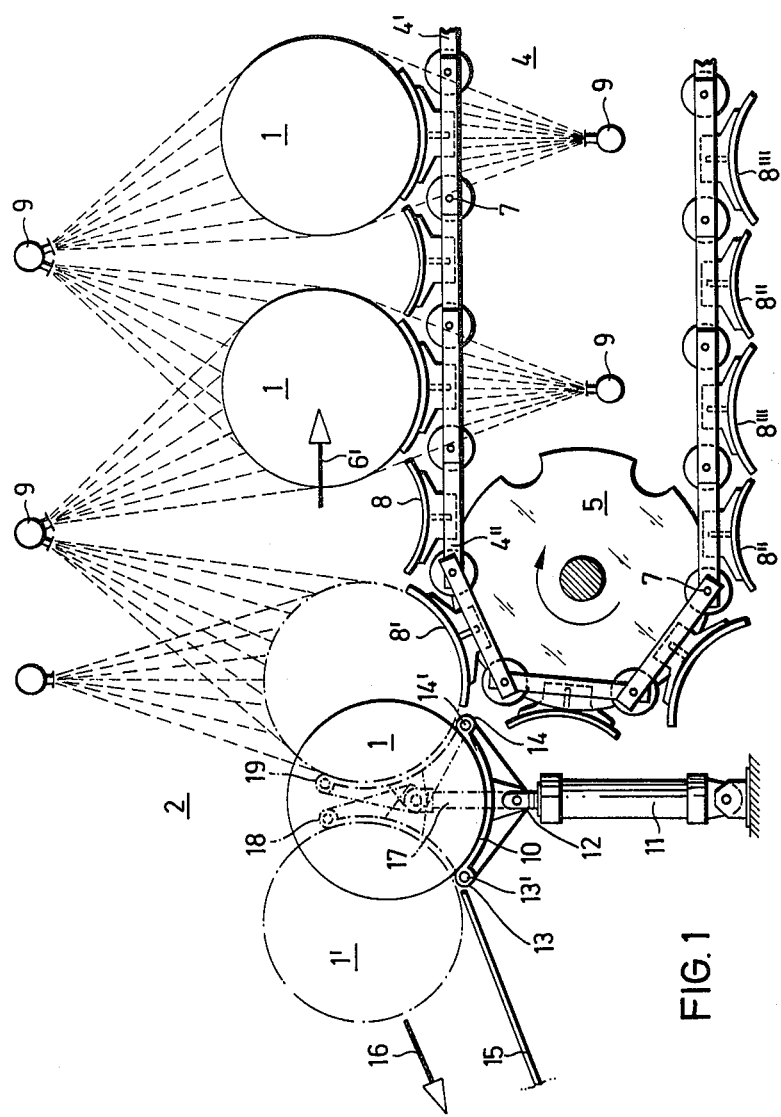
FIG. 1 is a side elevational view, shown in somewhat schematic form at the receiving end of a conveyor for conveying anodes through a cooling zone.
Figure 2:
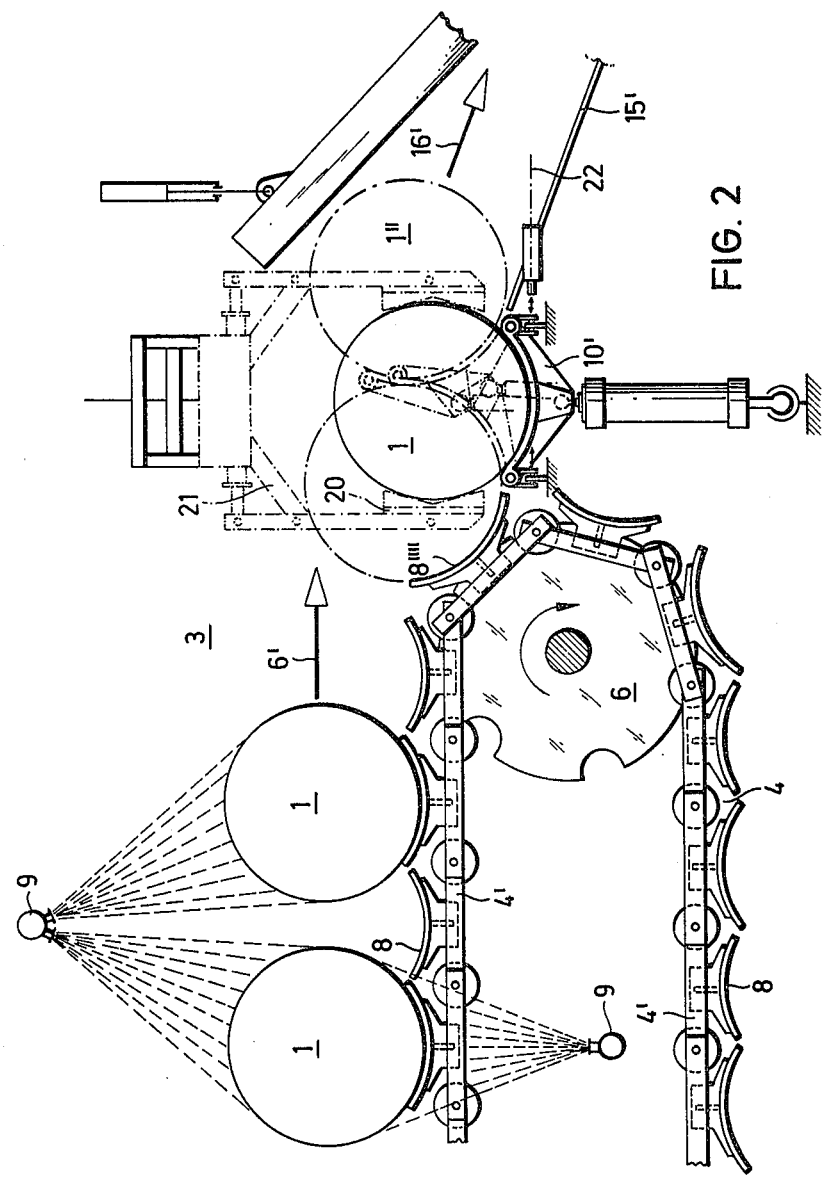
FIG. 2 is a view in elevation, shown in somewhat schematic form of the conveyor at the delivery end.

FIGS. 1 and 2 respectively show a molded green anode 1 being received and transferred through a cooling zone. For the sake of simplicity of the drawing, the cooling zone or cooling tunnel through which the molded bodies 1 are carried is an enclosing protective housing which may take any suitable form. The molded bodies 1 are first received on a receiving transfer means 2, transferred and carried on a conveyor 4 through a cooling zone, and are discharged by a discharge conveyor 3 as shown in FIG. 2.

The conveying means 4 is a chain link conveyor 4' where the chains are carried on sprockets 5 and 6 which are driven by a suitable drive, not shown, at an appropriate speed so that the anodes will be sufficiently cooled in their travel from the receiving end to the discharge end of the conveyor.

The link conveyor has individual links 4' which are connected to each other by means of pivotal joints 7 and the links 4' carry a support element 8 which is upwardly facing concave or disk shaped so as to provide surface-to-surface support for the cylindrical molded bodies 1. The bodies which are green anodes, are supported on the support elements 8 which are grate-like in that they have spaced curved bars with open areas inbetween for the flow of a cooling fluid around the bodies 1.

The support elements 8 and 8' are secured to the links 4" in an easily interchangeable manner so that individual support elements can be quickly and readily removed for the attachment of replacement support elements which may be needed if the machine is to be adapted to anodes of a different size. The radius of curvature of the support elements will be the same as the anodes to provide surface-to-surface support of the anodes which are still in the relatively plastic or moldable state.

It is particularly advantageous to equip the individual links 4" with support elements of different sizes, for example, in such a manner that two support elements of different sizes are disposed on the link conveyor 4' following one another. For example, the support element 8 and the support element 8' will be of different radii, and for one operation only alternate supports 8 will be used, and for another operation the other alternate supports 8' will be used. This permits operation of the same structure with two different sizes of anodes without altering the conveyor structure. The delivery of the anodes to the conveyor is controlled by the receiving transfer means 2.

The support elements are designed as grate surfaces so that the cooling fluid which is directed to the anodes from the stationary nozzles 9 below the conveyor and above the conveyor can reach the surfaces of the molded bodies from nearly all sides so that an optimum cooling effect is achieved. The nozzles 9 are connected to pressure lines such as for cooling air or cooling liquid. In some instances it may be desirable to utilize cooling nozzles only below the conveyor or only above the conveyor, and this may be accomplished with a single structure by the employment of control valves which can shut off either set of nozzles.

The receiving transfer means 2 includes an upwardly faced concave disk shaped element 10 pivotally supported on its base at a central location on a pivot pin 12. The pivot pin is mounted on a piston cylinder unit 11 with the piston selectively driven upwardly to the dotted line position shown in FIG. 1 to pivot the receiving transfer unit either to the left or to the right as will be described. In other words, the supporting transfer unit 10 pivots to the left to reject the anode, or pivots to the right to deliver the anode to the conveyor, in accordance with the acceptability of the anode which is delivered onto the receiving unit 10 from the molding mechanism. The transfer element 10 pivots about its lateral horizontal edge 13 on a pivot pin 13' to reject the anode, or selectively pivots about a second edge 14 on a pivot pin 14' to deliver the anode to the conveyor. For rejection the transfer element pivots to position 18 and for delivery to position 19. The details of construction will be described later in connection with FIG. 3.

The molded green anodes 1 which are to be cooled are first moved, usually by axial displacement, onto the concave disk shaped plate element 10 of the receiving transfer means such as by a hydraulic piston which slides the anodes onto the concave surface. The concave surface is solid for maximum support of the anode, and the plate element 10 receives the anode 1 in the solid line position of the plate transfer means of FIG. 1. Either before movement of the anode or during or immediately after movement of the anode onto the plate transfer element 10, a dimensional check of the accuracy of the anode is made. This can be carried on automatically by any commercially available test mechanism so that the description of such mechanism is not necessary here. In any event when the anode reaches the solid line position on the transfer plate 10, a signal is sent to the machine telling it to either reject the anode and move it to the left to position 1', or to accept the anode and move it to the right onto the conveyor as shown in FIG. 1.

Molded bodies not coming up to the required dimensional standard are discharged to the left to roll out over an inclined discharge surface 15 in the direction of the arrow 16. This occurs when the transfer plate 10 is moved from the solid line position up to the position shown at 18 which occurs by the piston rod 17 moving upward to pivot the plate 10 about the pivot axle or pin 13'. The molded body will roll out of the plate 10 and down onto the reject surface 15.

Molded bodies which are standard and are up to the limitations required of a proper anode are transferred to a support element 8' of the conveyor 4. The conveyor either operates continuously or indexes so as to halt a support element 8' in the position shown in FIG. 1 to receive the molded body from the transfer plate 10. This is accomplished by a controlled synchronous drive or manually and the drive of the conveyor is sychronized with the operation of the piston and cylinder 11 so that the receiving plate 8' is in position to receive the anode. Once the anode is onto the plate 8', the conveyor moves it forwardly in the direction of the arrowed line 6' through the cooling zone until the anode reaches the discharge transfer location shown in FIG. 2.

An alternative arrangement is possible with respect to rejection of the molded bodies in that they can be ejected axially instead of being rolled off of the plate 10 as shown in FIG. 1. For this purpose, the plate can alternately be pivotal about its end so that it can upended with vertical movement of the piston rod 17.

Referring again to the delivery end of the conveyor as shown in FIG. 2, the molded bodies may be taken from the delivery end of the machine by either rolling down the ramp 15' or by being lifted vertically by gripping jaws 20. Since the mass of the molded body will have achieved a certain rigidity in being cooled, it can be gripped as between jaws 20. The jaws are carried on a crane suspension mechanism 21 which has operating mechanism to move the jaws toward each other to grip the bodies 1, or to move the jaws apart to release the bodies, and the crane can move vertically and axially in a manner which will be fully appreciated by those versed in the art. The arrangement can be set up so that acceptable units are gripped by the jaws and moved vertically and rejects are rolled down the ramp 15', or vice versa, that rejected bodies can be lifted off the unit by the jaws and acceptable units rolled down the ramp. Preferably, the jaws are utilized to remove the rejected bodies and the acceptability bodies rolled down the ramp 15'.

It is also possible that the rejected bodies can be carried off of the delivery transfer plate 10' by means of axial displacement such as by a piston pushing them axially off of the plate.

FIG. 2 illustrates the plate 10 pivoted about its left edge and moved up into the lefthand dotted line position to receive an anode coming off the conveyor plate 8''''. The plate 10' pivots about its right edge up to the dotted line position to roll an anode 1'' down the ramp 15 in the direction of the arrowed line 16'. If the plate is to pivot about its end so as to pivot about an axis transverse of the pivot points illustrated for the dotted line positions, then a pivot pin is moved inwardly along axis 22, and the details of such structure will be described in connection with FIG. 3.

Figure 3:
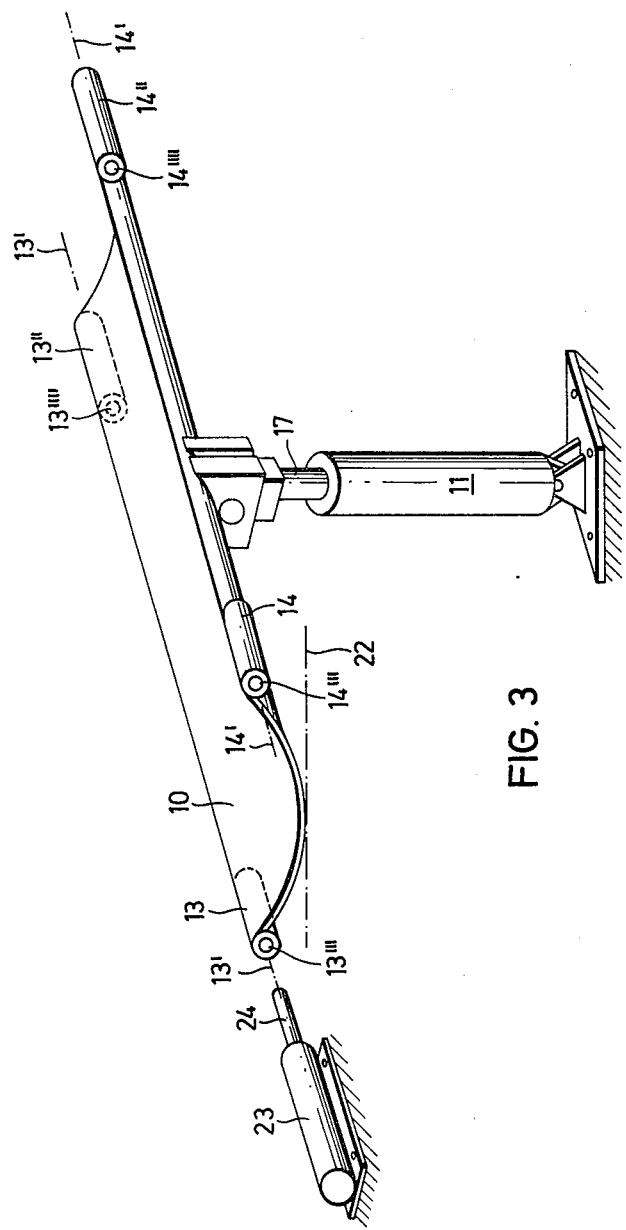
FIG. 3 is a perspective view of the construction of the receiving or the delivery transfer means.

In FIG. 3, a transfer element 10 is shown which may be either the receiving transfer element or the discharge transfer element inasmuch as both have the same construction. The concave disk shaped plate 10 is provided with sockets or journals 13 and 13'' along one edge and 14 and 14'' along the other edge. These journals are equipped to receive pivot pins which are driven axially into the journals. For example the journal 13 has an axial bore 13''' which receives the pivot pin 24 driven into it along the axis 13' by an operator 23 which may be hydraulically, pneumatically or electrically operated. The pivot pin 24 has a corresponding pivot pin for the other end of the plate 10 which is inserted into the opening 13''''. Thus, when the pins at both ends of one side of the plate 10 are in place, and the piston rod 17 moves upwardly, the plate will pivot about its left edge as shown in FIG. 3. This operation, for the receiving element 10, is utilized to pivot the plate to the left for the reject anode as was described in connection with FIG. 1.

A similar set of pivot pins are provided for the right edge of the plate 10, and when the plate is to be pivoted to the right, the pins at the left edge are withdrawn, and the pins on the right edge are inserted into their respective openings 14''' and 14'''' for the journals 14 and 14''. The plate will then pivot about its second axis 14' when the piston rod 17 is driven upwardly. The same arrangement is utilized at the right end of the machine as shown in FIG. 2. Control of the mechanism for inserting the pivot pins is done either manually, but preferably by a synchronous mechanism which automatically inserts the pins at one edge of the plate and withdraws them at the other edge of the plate depending upon whether the anodes are to be rejected or accepted.

In operation, as shown in FIG. 1, a carbon anode 1 is delivered axially onto a receiving transfer plate 10, and the plate is either pivoted to the left if the anode has not come up to the dimensional standard required, or delivered to the right onto a conveyor plate 8' on the conveyor. The conveyor moves forwardly carrying the anode through the cooling zone subjected to the streams of cooling fluid provided by the nozzles 9. At the right of the machine, the cooled anodes are delivered onto a discharge plate 10' with the plate being pivoted up to the lefthand dotted line position for receiving the anode, and then the plate dropping down to the solid line position of FIG. 2 and subsequently being pivoted up to the righthand broken line position so that the anode 1'' rolls down the incline 15' in the direction of the arrowed line 16'. Rejects are gripped by the jaws 20 and either slid axially or lifted vertically off of the plate 10'. Operation of the piston and cylinder 11 and insertion of the pivot pins at either edge of the plate is accomplished automatically by a synchronized control mechanism.

Thus, it will be seen that I have provided an improved device for gently handling formed plastic carbon anodes, for transferring them onto a cooling conveyor, and discharging them after they have been cooled. The mechanism provides maximum support to the anodes and is capable of accepting or rejecting them at the receiving end of the cooling structure or accepting or rejecting them at the discharge end.

I claim as my invention:

1. A mechanism for cooling molded bodies having moldable masses such as carbon anodes comprising in combination:
    a conveyor for gently carrying heated moldable bodies through a cooling zone having a plurality of support stations;
    a concave receiving shaped transfer means at the receiving end of the conveyor for receiving individual bodies and gently transferring them to the individual support stations;
    a concave shaped grate-like support element shaped to provide surface shape retaining support to the moldable bodies for each of the support stations;
    cooling means positioned for directing a cooling medium over the bodies on the conveyor during travel through the cooling zone;
    and a discharge transfer means at the delivery end of the conveyor gently receiving the bodies.

2. A mechanism for cooling molded bodies having moldable masses constructed in accordance with claim 1:
    wherein said transfer means has support elements of different sizes.

3. A mechanism for cooling molded bodies having moldable masses constructed in accordance with claim 2:
    wherein the support elements of different sizes are positioned in regular sequence on a link conveyor forming the conveying means.

4. A mechanism for cooling molded bodies having moldable masses constructed in accordance with claim 1:
    wherein at least one of said transfer means includes a support pivotally mounting the transfer means for pivotal movement about a horizontal axis for movement between a receiving and a delivery position.

5. A mechanism for cooling molded bodies having moldable masses constructed in accordance with claim 4:
    and including a piston and cylinder operator for moving the transfer means between said receiving and said delivery positions.

6. A mechanism for cooling molded bodies having moldable masses constructed in accordance with claim 1:
    wherein at least one of said transfer means is pivotally movable selectively about first or second axes with the first axes utilized for pivoting the transfer means to a reject position and the second axes utilized for pivoting a transfer means to a delivery position.

7. A mechanism for cooling molded bodies having moldable masses constructed in accordance with claim 6:
    wherein said pivotal transfer means is provided with an additional pivotal support for pivotal movement about an axis extending horizontally and transverse to the first and second axes.

8. A mechanism for cooling molded bodies having moldable masses constructed in accordance with claim 1:
    wherein at least one of said transfer means is selectively pivotal about first or second horizontal axes with the axes having engageable and disengageable axle journals which are moved to engagement or disengagement by power means.

9. A mechanism for cooling molded bodies having moldable masses constructed in accordance with claim 8:
    wherein said transfer means has a concave upwardly facing support surface and said first and second axes are positioned at the edges of said support surface.

10. A mechanism for cooling molded bodies having moldable masses constructed in accordance with claim 8:
    wherein said axes include journals on the transfer means with axially movable pivot shafts selectively engageable with the journals for pivotal movement about either of the axes.

11. A mechanism for cooling molded bodies having moldable masses constructed in accordance with claim 1:
    wherein said cooling means includes means for spraying a cooling liquid disposed above or below the conveyor.

12. A mechanism for cooling molded bodies having moldable masses comprising in combination:

a conveyor for carrying heated moldable bodies through a cooling zone and having a plurality of support stations;

a shaped support element for each station for providing shape retaining support to the body during travel through the cooling zone;

a receiving transfer means positioned at the receiving end of the conveyor for receiving bodies;

a cooling means positioned for directing a cooling medium over the bodies on the conveyor during travel through the cooling zone;

and means for selectively moving said transfer means to a delivery position where the body is transferred to a support element or to a reject position where an improperly molded body is rejected.

13. A mechanism for cooling molded bodies having moldable masses constructed in accordance with claim 12:

and including a delivery transfer means positioned at the delivery end of the conveyor for receiving cooled bodies and means for selectively moving said delivery transfer means to a reject position where improperly shaped bodies are discharged or to an acceptable transfer position where properly molded bodies are delivered from the conveyor.

14. A mechanism for cooling molded bodies having moldable masses constructed in accordance with claim 12:

wherein said receiving transfer means is in the form of a concave upwardly facing dish shaped surface with journal openings at each side of the surface and selectively movable shafts moved into the openings for pivotal movement of the surface about either edge.

15. A mechanism for cooling molded bodies having moldable masses comprising in combination:

a conveyor for carrying heated moldable bodies through a cooling zone having a plurality of support stations;

a shaped support element for providing shape retaining support for the body during travel through the cooling zone;

a cooling means positioned for directing a cooling medium over the bodies on the conveyor during travel through the cooling zone;

a delivery transfer means positioned at the delivery end of the conveyor for receiving bodies and discharging them from the conveyor;

and means for selectively moving said delivery transfer means to an acceptable discharge position where an acceptable body is transferred from the conveyor or to a reject discharge position where a reject body is transferred from the conveyor.

* * * * *